(12) United States Patent
Gholap et al.

(10) Patent No.: US 10,466,463 B2
(45) Date of Patent: Nov. 5, 2019

(54) SMART MICROSCOPE SLIDE FOR CONCURRENT STORAGE OF A SPECIMEN AND ASSOCIATED DIGITAL DATA, AND METHOD OF USE THEREOF

(71) Applicant: OptraScan, Inc., Cupertino, CA (US)

(72) Inventors: Abhijeet Gholap, Cupertino, CA (US); Anagha Jadhav, Sunnyvale, CA (US); Isha Doshi, Sunnyvale, CA (US)

(73) Assignee: OPTRASCAN, INC., Cupertino, CA (US)

( * ) Notice: Subject to any disclaimer, the term of this patent is extended or adjusted under 35 U.S.C. 154(b) by 280 days.

(21) Appl. No.: 15/594,468

(22) Filed: May 12, 2017

(65) Prior Publication Data

US 2017/0329121 A1    Nov. 16, 2017

Related U.S. Application Data

(60) Provisional application No. 62/335,585, filed on May 12, 2016.

(51) Int. Cl.
*G02B 21/34* (2006.01)
*G06F 13/42* (2006.01)

(52) U.S. Cl.
CPC ......... *G02B 21/34* (2013.01); *G06F 13/4282* (2013.01)

(58) Field of Classification Search
CPC ............................ G02B 21/34; G06F 13/4282
See application file for complete search history.

(56) References Cited

U.S. PATENT DOCUMENTS

2011/0031139 A1*  2/2011  Macor .................... B01L 3/508
                                                                  206/232

* cited by examiner

*Primary Examiner* — Dennis White

(57) ABSTRACT

A smart microscope slide for concurrent storage of a specimen and associated digital data consists of a data storage device and a microscope slide which are connected adjacent to each other. The data storage device and the microscope slide are connected together through a structural body. Digital data associated with a specimen may be stored in the same physical object as the specimen mounted to the slide, thus consolidating the physical specimen and the digital information in one place for ease of access.

7 Claims, 5 Drawing Sheets

SMART MICROSCOPE SLIDE FOR CONCURRENT STORAGE OF A SPECIMEN AND ASSOCIATED DIGITAL DATA, AND METHOD OF USE THEREOF

The current application claims a priority to the U.S. Provisional Patent application Ser. No. 62/335,585 filed on May 12, 2016.

FIELD OF THE INVENTION

The present invention relates generally to pathology. More particularly, the present invention relates to microscope slides used to examine biological specimens.

BACKGROUND OF THE INVENTION

The science of histopathology and cytopathology is going towards more and more objectivity day by day. The recent increase in newer tools like automated microscopes, digital cameras, etc. are giving rise to the need for more sophisticated diagnosis and analysis software tools. Reading and analysis of histological, cytological and immunohistochemical specimens on glass slides in the anatomic pathology laboratory is the most challenging task. This is also the need of time as clinicians and oncologists are expecting a high level of precision, objectivity, reproducibility and standardization in the pathological results from the pathologists.

While pathologists are required to look at glass slides with these pathological/biological specimens, often they tend to look at images of glass slides. For any queries, concerns, or doubts, they require verification with a microscopic view of the actual glass slides. Herein lies a challenge to correlate data between the glass slide and digital images of the glass slides. In order to assist pathologists in their analyses for the purpose of detecting, counting, and classifying tissues or cells of clinical interest, a sophisticated SmartGlassSlide is designed which will enable pathologists to deliver more consistent, more precise analyses of a slide's contents than would be possible through a manual analysis of either glass slides though standard light microscope or digital image of the same glass slide.

The present invention provides a novel way of storing digital data of the pathological/biological specimen, whether said data is an image, clinical, patient, experiment, biomarker, treatment, diagnostics, therapy, or contextual data saved in USB storage provided on the same glass slide which has the pathological/biological specimen adjacent to it.

The pathologist thus can put the same glass slide under a microscope to read optically or connect to a computer through USB to read digitally. This establishes 100% correlation between the optical and digital data, ensuring lower errors and thus improved accuracy of analysis for the betterment of health care.

The present invention will thus be a digital transformation of age old glass slides without losing benefits of having access to actual pathological/biological specimens along with digital information side by side.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention.

The present invention is a smart microscope slide for concurrent storage of a pathological, biological, or other type of specimen on a microscope slide, with the digital data associated with the specimen stored on a digital storage medium attached to the same slide. Thus, the specimen and its associated digital data are consolidated into a singular form, making accessing the specimen itself for optical examination as well as its correlated digital data much more convenient.

Figure 1:
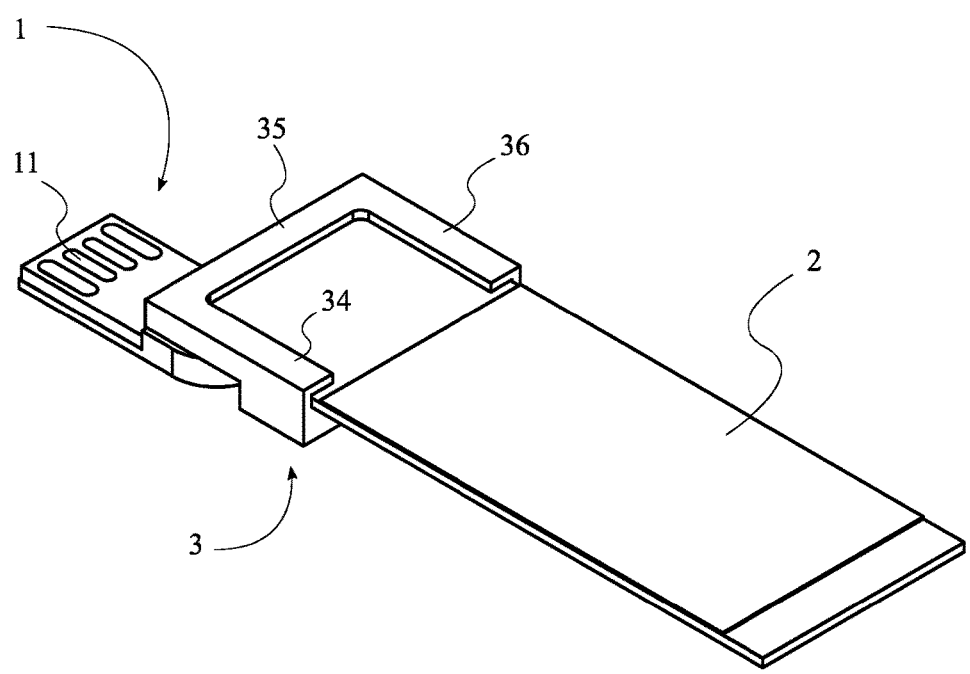
FIG. 1 is a raised perspective view of one embodiment of the present invention.
Figure 2:
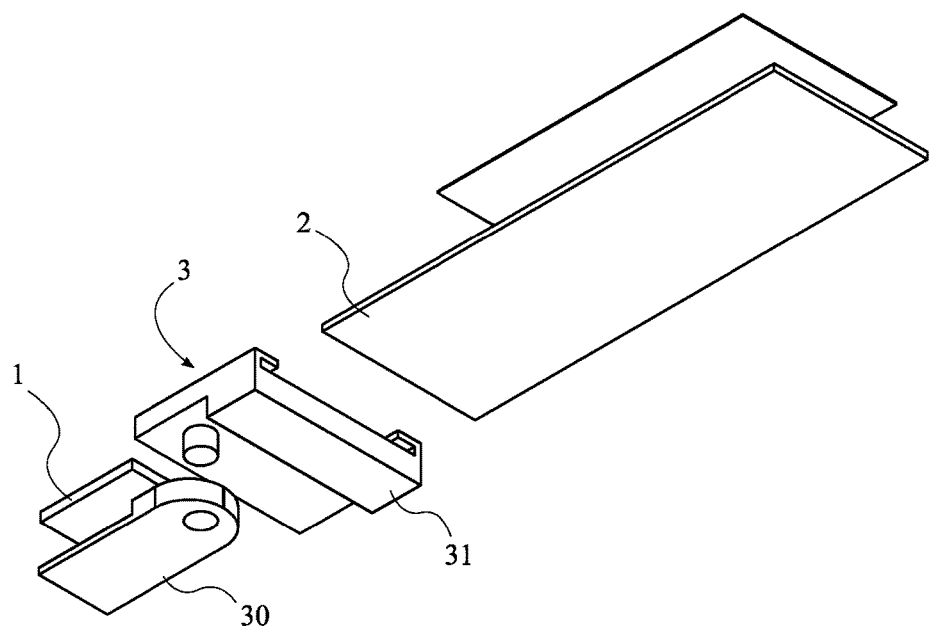
FIG. 2 is a lowered perspective exploded view of one embodiment of the present invention.
Figure 3:
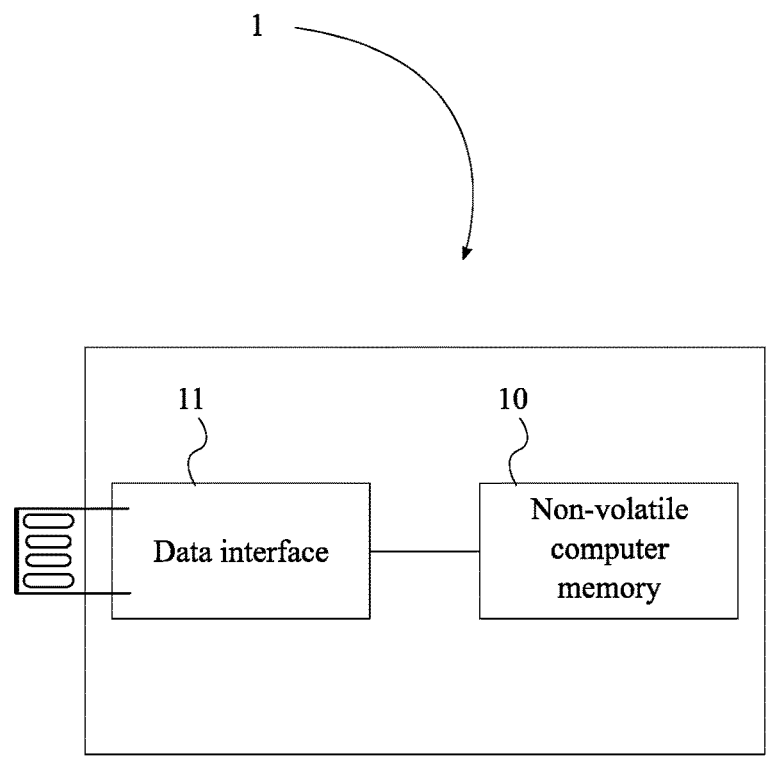
FIG. 3 is a schematic diagram of the data storage device.

In general, the preferred embodiment of the present invention comprises a data storage device 1 and a microscope slide 2, as seen in FIGS. 1-2. The data storage device 1 comprises a non-volatile computer memory 10 and a data interface 11, as shown in FIG. 3. The non-volatile computer memory 10 may be, but is not limited to, flash memory or another type of digital data storage medium. In the preferred embodiment, the data interface 11 is a universal serial bus (USB) interface. In other embodiments, the data interface 11 may be another type of interface, such as, but not limited to, a secure digital (SD) card interface, a serial ATA (SATA) interface, or any other relevant type of computer data interface 11. The microscope slide 2 is connected adjacent to the data storage device 1 opposite the data interface 11. In other embodiments, the microscope slide 2 and the data storage device 1 may be connected together in any configuration that facilitates the data storage device 1 to be connected to a computing device and the microscope slide 2 to be utilized according to its typical purpose. The digital data associated with a specimen must be acquired through typical means, such as a digital microscope or a word processing or other type of data processing application, and manually stored on the data storage device 1.

In one embodiment, the data storage device 1 and the microscope slide 2 are connected through a structural body 3. The data storage device 1 is connected to the structural body 3, and the microscope slide 2 is connected to the structural body 3 opposite the data storage device 1.

More particularly, in one embodiment, the structural body 3 comprises a data storage support member 30 and a slide support member 31. The data storage member is connected adjacent to the slide support member 31. The data storage device 1 is connected atop the data storage support member 30, or within the data storage support member 30, or in any configuration in which the data interface 11 is exposed for insertion into a receiving port in a computing device. The microscope slide 2 is connected to the slide support member 31 opposite the data storage support member 30. In one embodiment, the data storage support member 30 is pivotally connected to the structural body, as seen in FIGS. 1-2.

Figure 4:
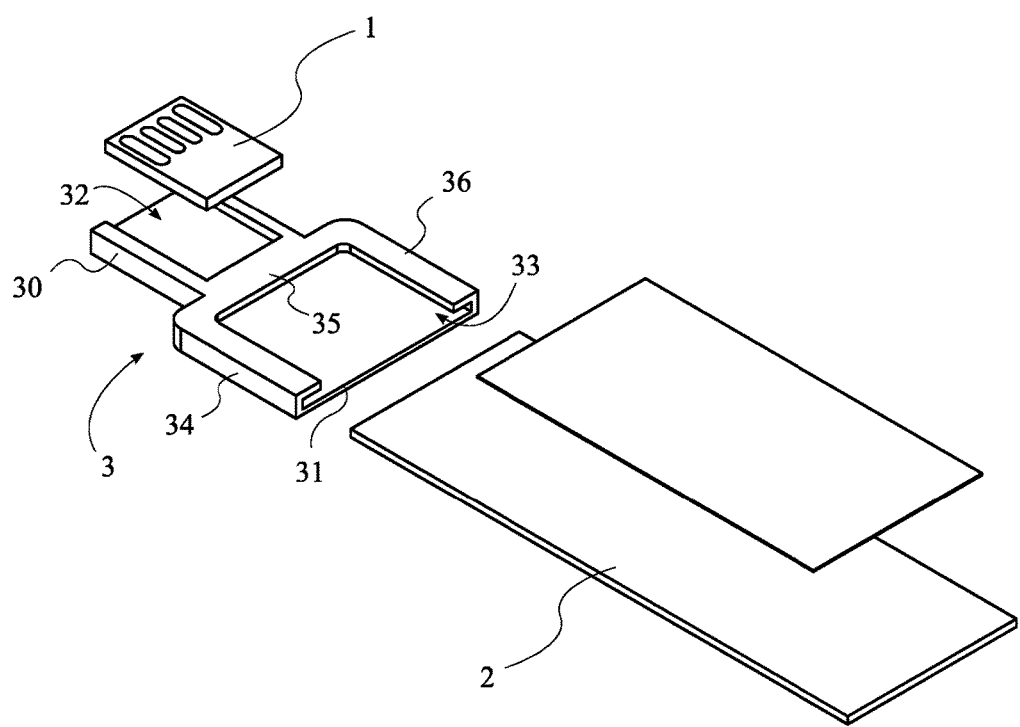
FIG. 4 is a raised perspective view of another embodiment of the present invention.

Referring to FIG. 4, in one embodiment the structural body 3 comprises a data storage recess 32 and a slide recess 33. The data storage recess 32 and the slide recess 33 are positioned opposite each other on the structural body 3. The data storage recess 32 traverses into the data storage support member 30, while the slide recess 33 traverses into the slide support member 31. The data storage device 1 is connected within the data storage recess 32, so that the data interface 11 is offset from the structural body 3 along the data storage device 1. Alternatively, the data storage device 1 may be removably positioned into the data storage recess 32. The microscope slide 2 is removably positioned into the slide recess 33. Alternatively, the microscope slide 2 may be permanently connected into the slide recess 33. Thus, the structural body 3 forms a structural connection between the data storage device 1 and the microscope slide 2. In one embodiment, both the data storage device 1 and the microscope slide 2 may be removed from their respective recesses, enabling modularity and re-use of the data storage device 1, structural body 3, and microscope slide 2, if desired.

Moreover, in one embodiment, the slide support member 31 comprises a first lateral member 34, a central member 35, and a second lateral member 36. The first lateral member 34 is terminally and perpendicularly connected to the central member 35, and the second lateral member 36 is terminally and perpendicularly connected to the central member 35 opposite the first lateral member 34 along the central member 35. The microscope slide 2 is connected within the first lateral member 34, the central member 35, and the second lateral member 36. Thus, the first lateral member 34, the central member 35, and the second lateral member 36 form a U-shaped bracket which serves to support the microscope slide 2 in connection adjacent to the data storage device 1.

It is considered herein that there may be two processes of creating a filled smart slide with a mounted specimen and associated digital data, which depend on the method of mounting the specimen. In one case, the specimen is mounted through means which would damage the data storage device 1, and thus the specimen is mounted to a separate microscope slide 2 first, and the microscope slide 2 is subsequently attached to the structural body 3. In another case, the bottom portion of the microscope slide 2 may come pre-installed to the structural body 3. Thus, the specimen is mounted to the pre-installed slide portion, and the cover slip is then placed atop the specimen.

Figure 5:
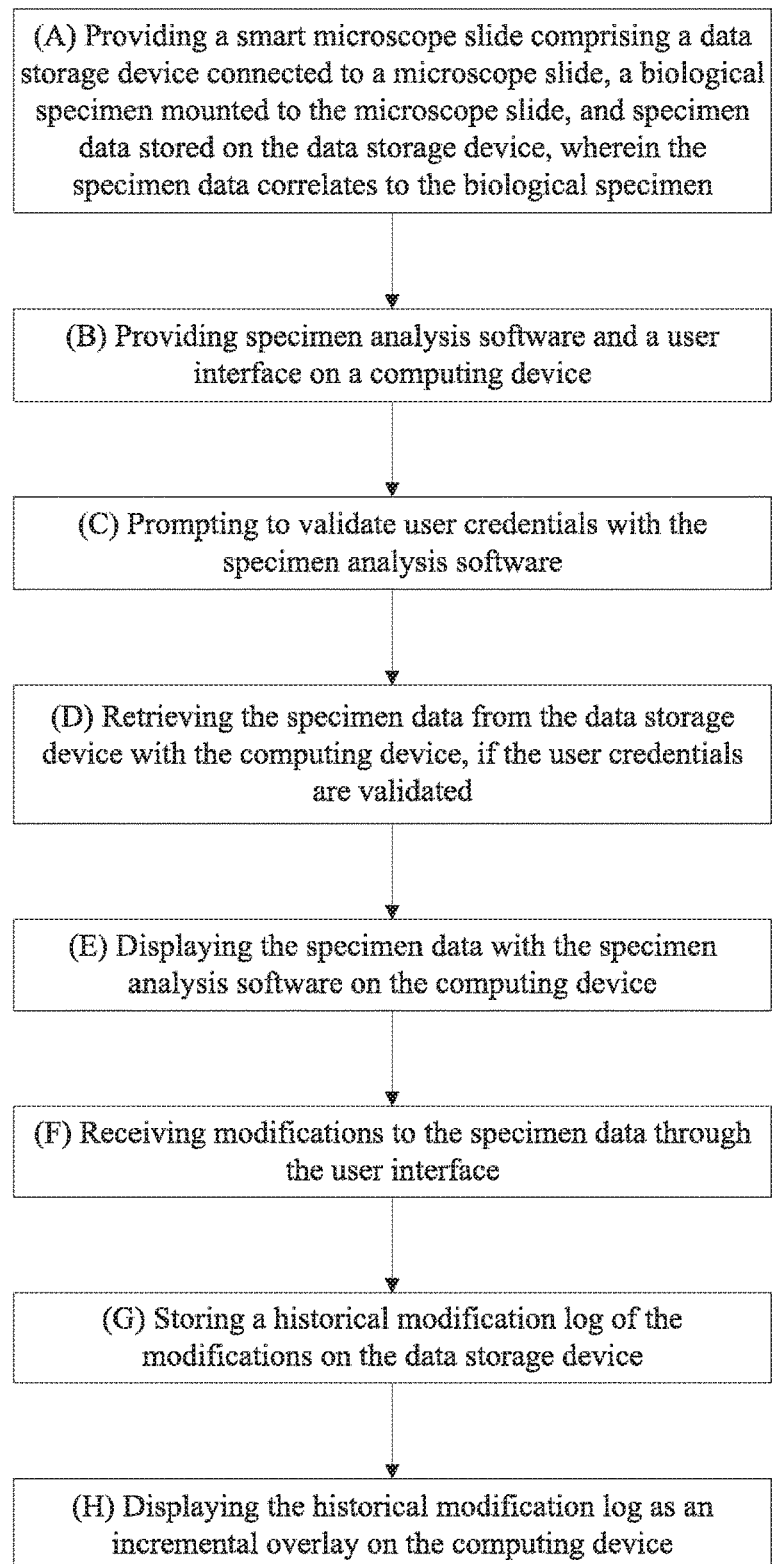
FIG. 5 is a stepwise flow diagram depicting steps in the method of using software with the present invention.

Furthermore, in the preferred embodiment, a dedicated self-running software is used to authenticate users before allowing access to the digital information stored on the data storage device 1. Thus, as shown in FIG. 5, in a method of use of the smart microscope slide 2 with a stored specimen and associated digital data, provided is a smart microscope slide 2 comprising a data storage device 1 connected to a microscope slide 2, a biological specimen mounted to the microscope slide 2, and specimen data stored on the data storage device 1, wherein the specimen data correlates to the biological specimen. Further provided is specimen analysis software and a user interface on a computing device. When the data storage device 1 is inserted into a corresponding data port of the computing device, the specimen analysis software prompts to validate user credentials in order to allow access to the specimen data. The specific method of validation of the user credentials may be performed in any relevant manner, and is inconsequential to the present invention. If the user credentials are validated, the specimen data is retrieved from the data storage device 1 with the computing device. The specimen data is then displayed with the specimen analysis software on the computing device.

In addition to viewing the specimen data, users may make modifications to the specimen data. Thus, if modifications to the specimen data are received through the user interface, a historical modification log of the modifications is stored on the data storage device 1. The historical modification log may include, but is not limited to, the user profile making the modifications, as well as all previous versions of the data. In one embodiment, where for example the modifications are made to a digital image or images, the historical modification log is displayed as an incremental overlay on the computing device. Thus, the user is able to see a timelapse of changes made to the digital image or images.

Although the invention has been explained in relation to its preferred embodiment, it is to be understood that many other possible modifications and variations can be made without departing from the spirit and scope of the invention as hereinafter claimed.

What is claimed is:

1. A smart microscope slide for concurrent storage of a specimen and associated digital data comprising:
   a structural body;
   a data storage device;
   a microscope slide;
   the structural body comprising a data storage support member and a slide support member;
   the data storage support member and the slide support member being connected to each other;
   the data storage support member comprising a data storage body and a data storage recess;
   the data storage recess traversing into the data storage body;
   the data storage device being positioned into the data storage recess,
   the slide support member comprising a first lateral member, a central member, a second lateral member, a base member and a slide recess;
   the first lateral member, the central member and the second lateral member being disposed on the base member;
   the first lateral member being terminally and perpendicularly connected to the central member;
   the second lateral member being terminally and perpendicularly connected to the central member;
   the central member being connected in between the first lateral member and the second lateral member;
   the first lateral member comprising a first side and a first eave;
   the first side being connected to the base member;
   the first eave being cantilevered from the first side;
   the second lateral member comprising a second side and a second eave;
   the second side being connected to the base member;
   the second eave being cantilevered from the second side;
   the slide recess being delineated by the central member, the base member, the first side, the first eave, the second side and the second eave;
   the microscope slide being positioned into the slide recess; and
   the data storage recess and the slide recess being oppositely positioned to each other.

2. The smart microscope slide for concurrent storage of a specimen and associated digital data as claimed in claim 1 comprising:
   the data storage device comprising a non-volatile computer memory and a data interface.

3. The smart microscope slide for concurrent storage of a specimen and associated digital data as claimed in claim 2 comprising:
the data interface being a universal serial bus (USB) interface.

4. The smart microscope slide for concurrent storage of a specimen and associated digital data as claimed in claim 2 comprising:
the data interface being offset from the structural body along the data storage device.

5. The smart microscope slide for concurrent storage of a specimen and associated digital data as claimed in claim 1 comprising:
the microscope slide being permanently positioned into the slide recess.

6. The smart microscope slide for concurrent storage of a specimen and associated digital data as claimed in claim 1 comprising:
the microscope slide being removably positioned into the slide recess.

7. A method of use of a smart microscope slide with a stored specimen and associated digital data by executing computer-executable instructions stored on a non-transitory computer-readable medium comprising:
providing a smart microscope slide;
the smart microscope slide comprising:
a structural body;
a data storage device;
a microscope slide;
the structural body comprising a data storage support member and a slide support member;
the data storage support member and the slide support member being connected to each other;
the data storage support member comprising a data storage body and a data storage recess;
the data storage recess traversing into the data storage body;
the data storage device being positioned into the data storage recess,
the slide support member comprising a first lateral member, a central member, a second lateral member, a base member and a slide recess;
the first lateral member, the central member and the second lateral member being disposed on the base member;
the first lateral member being terminally and perpendicularly connected to the central member;
the second lateral member being terminally and perpendicularly connected to the central member;
the central member being connected in between the first lateral member and the second lateral member;
the first lateral member comprising a first side and a first eave;
the first side being connected to the base member;
the first eave being cantilevered from the first side;
the second lateral member comprising a second side and a second eave;
the second side being connected to the base member;
the second eave being cantilevered from the second side;
the slide recess being delineated by the central member, the base member, the first side, the first eave, the second side and the second eave;
the microscope slide being positioned into the slide recess; and
the data storage recess and the slide recess being oppositely positioned to each other;
providing a biological specimen;
mounting the biological specimen to the microscope slide;
storing specimen data on the data storage device;
correlating the specimen data to the biological specimen;
providing specimen analysis software and a user interface on a computing device;
prompting to validate user credentials with the specimen analysis software;
retrieving the specimen data from the data storage device with the computing device, if the user credentials are validated;
displaying the specimen data with the specimen analysis software on the computing device;
receiving modifications to the specimen data through the user interface;
storing a historical modification log of the modifications on the data storage device; and
displaying the historical modification log as an incremental overlay on the computing device.

* * * * *